Figure 1:
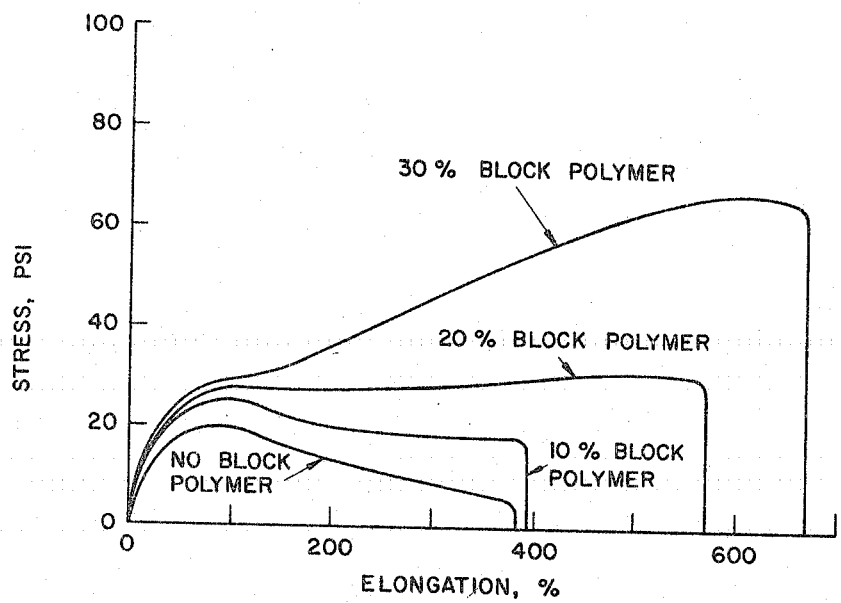

THE EFFECT OF BLOCK POLYMER LEVEL UPON THE STRESS-STRAIN BEHAVIOR OF MASTICATED GREEN COMPOUNDS

THE STRESS-STRAIN PROPERTIES OF GREEN STOCKS REINFORCED WITH VARIOUS BLOCK POLYMERS AT A 30 PHR LEVEL

INVENTORS:
GEOFFREY HOLDEN
RALPH MILKOVICH
BY: *William H. Myers*
THEIR AGENT

DIETERT DRYING RATE OF SIS DELTA POLYMER-POLYISOPRENE BLENDS

United States Patent Office 3,322,856
Patented May 30, 1967

3,322,856
METHOD OF PREPARING DIENE ELASTOMER/
BLOCK COPOLYMER COMPOSITION
Geoffrey Holden, Anaheim, Calif., and Ralph Milkovich, Stow, Ohio, assignors to Shell Oil Company, New York, N.Y., a corporation of Delaware
Filed Nov. 7, 1963, Ser. No. 322,174
3 Claims. (Cl. 260—876)

This application is a continuation-in-part of copending application Ser. No. 169,674, filed Jan. 29, 1962 and now U.S. Patent No. 2,265,765.

This invention is concerned with elastomer compositions. More particularly it is directed to elastomer compositions comprising predominately elastomers of conjugated diene modified with certain block copolymers.

Synthetic elastomers of certain conjugated dienes have received increasing attention as synthetic rubber replacements for natural rubber or as blending components therewith. In many respects, these synthetic rubbers show advantages over the natural product especially relative to the control over molecular weight, the corresponding control over solubility and the lack of non-rubber constituents present in these products. However, the synthetic rubbers such as polyisoprene and polybutadiene are subject to certain disadvantages which natural rubber does not possess or which are minimized therein. For example, the natural product has been used for a sufficient period of time that commercial apparatus has been designed for its handling, such as in milling operations and the like.

While synthetic rubbers may be processed in the same equipment, in certain instances this has not been fully satisfactory. The synthetic rubbers are sometimes said to have "poor processability," by which is meant that they do not respond in the same fashion in milling operations and the like as is experienced with natural rubber. Presumably this is due to the relatively narrow molecular weight range in which synthetic rubbers are usually produced, especially if they are of the desirable "high cis" variety. At the same time, the synthetic rubbers often exhibit what is referred to as "poor green strength." Green strength is a highly elusive quality to define in terms of measured properties. Relatively speaking, it includes both bulk viscosity and resistance to shear or tensile fracture over a wide range of temperatures and strain rates. In practical terms, poor green strength is manifested as crumbling during mixing, yielding under static load conditions, sagging of hot exrudate and a multitude of similar phenomena. Many synthetic rubbers, such as polyisoprene, demonstrate various shortcomings in green strength and, generally, become progressively softer and weaker with the shear degradation which accompanies prolonged processing.

Recent developments in this area have provided improvement in the processability of synthetic elastomers derived from conjugated diene by incorporation therein of relatively low molecular weight fractions of conjugated diene polymers. While this improved the processability of these synthetic elastomers, the low molecular weight fraction does not improve the green strength of the compositions and, in fact, may even cause further reduction in their green strength. Other recent advances in the general technology of rubbers and rubber like polymers has been the recent development of block copolymers which, when carefully designed, have so-called "self-curing" property, by which is meant that the block copolymer exhibits the properties of a vulcanized rubber without having been vulcanized insofar as its stress-strain properties are concerned.

Another problem met in the field of elastomers is that of handling relatively low molecular weight rubbery materials. The usual elastomers produced by synthetic means have a relatively high molecular weight (often expressed as high intrinsic viscosity). These materials are the ones particularly prone to exhibit processability problems. One means of minimizing these problems is to deliberately produce relatively low molecular weight polymers which, while retaining their elastomeric properties, would not exhibit the recalcitrant processability exhibited by their higher molecular weight homologs. Consequently, when low molecular weight elastomers were produced with this thought in mind, the problems of handling the material in the usual production equipment arose. One of the usual means of isolating the polymer is to produce it in cement form and thereafter flash off the solvent from the cement by contacting the latter with an aqueous medium (steam or water) at elevated temperatures. The solvent is removed as a vapor and the rubber obtained as a "crumb." This crumb must then be dried such as by traveling on a moving belt to an oven or other heated space. In order to remove all traces of water it is necessary to maintain a relatively porous crumb. This is relatively easy when utilizing high molecular weight elastomer. However, when low molecular weight homologs thereof are treated by the same processing steps, the resulting crumb is not only less porous but also tends to coalesce to a more dense particle when subjected to heating for water removal. The result is that water is encapsulated within the particles of low molecular weight rubber which are virtually uncapable of being dried by this method.

It is desirable to produce lower molecular weight rubbers for reasons other than processability. When the high molecular weight materials are subjected to milling there is usually a rapid initial scission of the long chain to form low molecular weight rubbers. This drastic reduction in average molecular weight is not experienced when relatively low molecular weight elastomers are treated under the same conditions. Starting with a relatively low molecular weight elastomer, milling and shearing operations cause a certain amount of degradation but only of a relatively minor degree. Consequently, it is found that the relatively high molecular weight rubbers exhibiting poor processability characteristics are reduced by milling to about the same average molecular weight obtained when treating low molecular weight elastomers. Hence, it is reasonable to attempt to produce low molecular weight elastomers in the first place if they can be adequately dried.

It is an object of this invention to improve the properties of synthetic elastomers derived from conjugated dienes. It is a particular objection of the invention to improve the green strength of conjugated diene elastomers. It is a further object of the invention to improve the driability of relatively low molecular weight elastomers derived from conjugated dienes. Other objects will become apparent from the following detailed description of the invention.

Now, in accordance with the present invention, improvements in synthetic elastomer compositions are provided wherein elastomers of conjugated dienes are modified with a minor but effective amount of block copolymers having the general configuration

A—B—A wherein each A is a polymer block of an alkenyl-substituted aromatic hydrocarbon and B is a polymer block of a conjugated diene. Hydrogenated derivatives of such block polymers may be used in addition to or in place of those just described.

Figure 2:
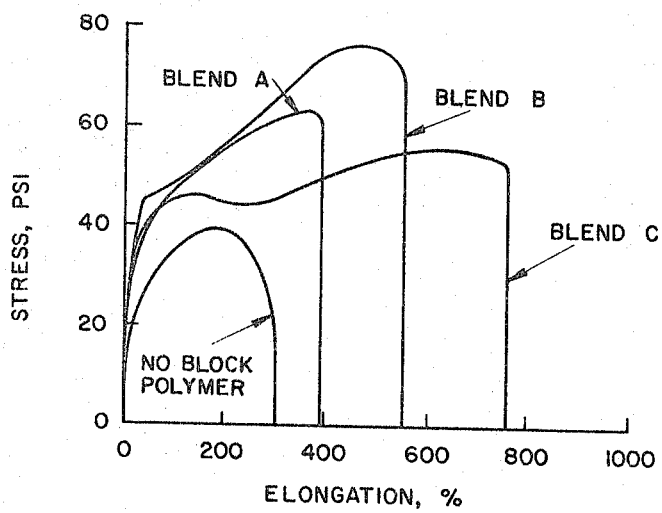
Figure 4:
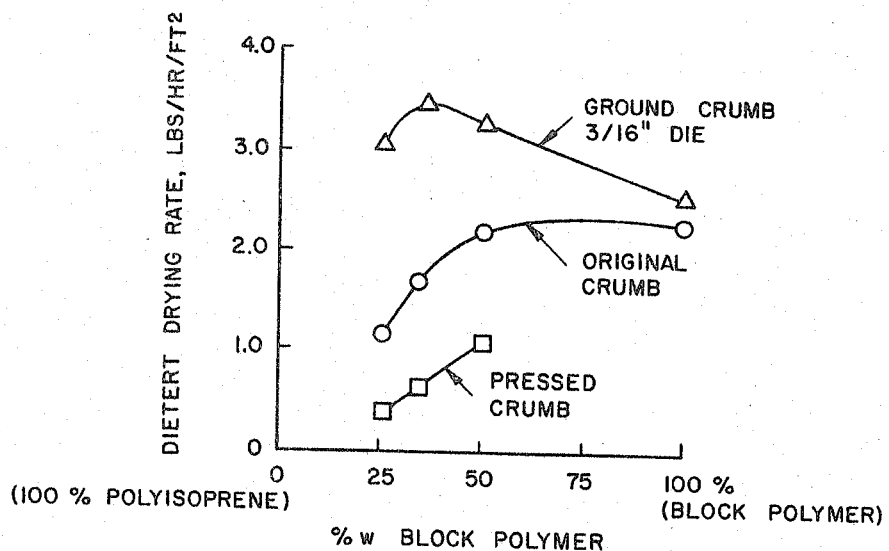

FIGURE 1 shows the effect of block copolymer concentration on the unvulcanized stress-strain properties of polyisoprene. FIGURE 2 shows the effect of segmental molecular weight of the block copolymer on the unvulcanized stress-strain properties of polyisoprene. FIG- URE 3 shows the effect of the extent of milling polyisoprene-block copolymer compositions upon their stress-strain properties. FIGURE 4 shows the effect of block copolymer upon the drying rate of low molecular weight of polyisoprene.

It has been found that the presence of the block copolymers substantially improves the green strength of the synthetic elastomers derived from conjugated dienes. Moreover, it has been found that the modification of relatively low molecular weight conjugated diene elastomers results in a composition which may be readily dried in the usual drying equipment designed for rubber processing.

Still in accordance with this invention, further improvements in elastomers derived from conjugated dienes comprises the modification of high molecular weight conjugated diene elastomers not only with the subject block copolymers but also with a minor proportion of a relatively low molecular weight conjugated diene polymer. Thus, the compositions embody within a single entity a rubber which will not only exhibit excellent green strength but also possess improved processability characteristics.

In order to obtain the maximum combination of the multiplicity of properties by which satisfactory rubbers are definable, it is preferred that the block copolymer be present in an amount of 5–45% (preferably 15–40%) by weight, based on the composition, the elastomeric polymer of conjugated diene being present in an amount of 95–55% (preferably 85–60%) by weight. When relatively low molecular weight conjugated diene polymers are part of the composition, they may form 5–30% by weight of the total composition. Moreover, the block copolymers may be still further defined for optimum effect in the present compositions when the terminal blocks A, being thermoplastic (non-elastomeric) have average molecular weight between about 2000 and 100,000 while the center elastomeric block B has an average molecular weight of 25,000–1,000,000. Certain preferred ranges of molecular weight will be discussed further hereinafter.

The presence of the block copolymer in modifying the conjugated diene elastomer results in a number of interlocking benefits including a marked increase in bulk consistency, exhibiting higher viscosity over a wide range of shear rates and temperatures. Moreover, the compositions retain their strength throughout prolonged processing and improved compounds result from easier handling during all compounding steps and give more uniform dispersion of pigments and curing agent.

The term "elastomer of conjugated dienes" is meant to include elastomers comprising at least about 90% of conjugated dienes and preferably 100% by weight thereof. The typical conjugated dienes contemplated are polyisoprene and polybutadiene as well as other conjugated dienes having from 4 to 8 carbon atoms per molecule and mixtures of such monomers may be utilized if desired. Optimum physical properties are obtained by employing elastomers having a relatively high cis 1,4-content usually in excess of about 85% and preferably above 90%.

The methods by which these elastomers are produced do not form a part of the present invention. High cis polyisoprene may be produced, for example by use of lithium-based catalysts such as lithium alkyls in a solution process. Cobalt catalysts are particularly efficient for the production of high cis polybutadiene. The proportion of catalysts and other conditions such as conditions and time are controlled to obtain a product of predetermined average molecular weight.

The product of most of these synthetic processes are relatively narrow in molecular weight spread, which accounts in part for the relatively difficult processability experienced with them. Consequently, they may be modified as referred to herein before, by the presence of 5–30% by weight based on the final composition of relatively low molecular weight conjugated diene polymers having intrinsic viscosities of 0.1–1 dl./g. The usual high molecular weight elastomers have an average intrinsic viscosity in the order of 3–20 dl./g., preferably 6–14 dl./g. in the case of polyisoprene. The low molecular weight fraction may be formed separately and later combined with the relatively high molecular weight elastomer or processes may be devised wherein the low molecular weight material is produced in situ.

The block copolymers combined with the conjugated diene elastomers in the products of this invention have the general configuration given hereinbefore, namely A—B—A, wherein each A is an independently selected polymer block of an alkenyl-substituted aromatic hydrocarbon and B is a polymer block of a conjugated diene. Optimum physical properties are obtained when each of the terminal blocks A have average molecular weight between about 10,000 and 45,000 while the center blocks have average molecular weights between about 35,000 and 150,000, the weight of the blocks A being less than about 38% by weight of the total block polymer. Still further improvements in the properties of the composition combined with the conjugated diene elastomers are experienced when the terminal block A have preferred average molecular weight of 12,500 and 33,000 while the center elastomeric block of the conjugated diene is preferably between about 50,000 and 200,000 average molecular weight, the weight of the blocks A being less than about 31% of the total block copolymer.

The present invention is based upon the finding that the presence of the block copolymer in the conjugated diene substantially improves the green strength properties of the conjugated diene elastomers. This is especially exhibited in the stress-strain properties of the resulting compositions prior to the vulcanization. Subsequent to vulcanization, the compositions appear to exhibit the desirable properties of the conjugated diene elastomer per se.

The non-elastomeric component in blocks A may comprise homopolymers or copolymers of alkenyl arenes, preferably monovinyl-substituted aromatic hydrocarbons, and exhibit the properties typical of resinous polymers or copolymers. Vinyl aromatic compounds include particularly monovinyl aromatic hydrocarbons of the benzene series such as styrene, alpha-methyl styrene, vinyl toluene, vinyl xylene, vinyl naphthalene and the like. The center elastomeric blocks are derived from the same class of conjugated dienes referred to hereinbefore, namely those having from 4 to 8 carbon atoms per monomer molecule and particularly including isoprene and butadiene.

The preparation of these block copolymers does not form a part of the present invention. Typical block copolymers include polystyrene-polyisoprene-polystyrene and polystyrene-polybutadiene-polystyrene, these copolyers having the block molecular weights referred to hereinbefore. While the process of preparing these materials is not part of the present invention, brief reference is made thereto for a more complete understanding of them: In a preferred process for their preparation, the block copolymers are prepared by the use of lithium based catalysts, preferably lithium alkyl. The monomers are incorporated in relatively inert hydrocarbon solvents such as benzene, cyclohexane or lower alkanes or alkenes such as mixed pentanes or pentenes and subjected to polymerization with an alkyl lithium catalyst. For example, the first polystyrene block may be so produced utilizing cyclohexane as solvent and a butyl lithium catalyst. After polymerization of the styrene or other vinyl arene, thus forming a "living polymer" terminated with lithium ion, the conjugated diene monomer is injected into the system and polymerization continued to form the elastomeric block, thus giving the intermediate living block copolymer A—B—Li. After polymerization of substantially all of the conjugated diene, a vinyl arene (the same or different from the first one utilized) is injected into the system to form the second terminal non-elastomeric polymer block. The resulting block copolymer then has the configuration A—B—A as described hereinbefore. It is preferably in the form of a cement for later incorporation with the conjugated diene elastomer.

The block copolymers described above may be modified by hydrogenation. The purpose of hydrogenation is several fold and is desirable but not essential. Reduction in unsaturation especially of the conjugated diene center block improves the resistance to oxidation and thermal degradation and moreover increases the service temperature at which the block copolymers may be utilized. This is especially true since the hydrogenation of the terminal block causes conversion of polystyrene to polycyclohexane and increases apparent glass temperature of the block copolymers. Hydrogenation may be effected by means of catalysts such as nickel on kieselguhr or more preferably noble metals on low surface area carriers, such as platinum on low surface area clay. The extent of hydrogenation may be either partial or complete but in order to be materially effective the original unsaturation should be reduced to less than 30% of the original value prior to hydrogenation.

The two major components of the present invention, namely the conjugated diene elastomer and the block copolymer are preferably mixed under such conditions as to result in a maximum dispersion of them one in the other. This is effectively carried out by combining the two cements although the two solid polymers may be dispersed on a mill or other type of shearing equipment. Even after formation of the mixture of the cement it may be desirable to subject the mixed cement to a high rate of shear, such as by passing through a spinning disc or circular saw blade disperser. The properties of the composition resulting from this high shear treatment have been found to be better in some cases than those obtained by conventional or low shear mixing of the cements and later coagulation. By high shear, it is meant that obtained, for example, in a colloid mill or in the spinning disc or circular saw blade disperser. While the degree of shear is difficult to define with any reasonable accuracy, it is preferably in excess of about 1000 reciprocal seconds.

The following examples illustrate a number of aspects of the present invention:

*Example I.—Effect of block polymer content on stress-strain properties*

A polyisoprene cement was formed by dissolving 85 parts by weight of a high molecular weight polyisoprene (10.0 intrinsic viscosity) and 15 parts by weight of a low molecular weight polyisoprene (0.5 intrinsic viscosity) in mixed pentanes solvent to form a cement. A block copolymer having the composition polystyrene-polyisoprene-polystyrene wherein the block molecular weights (in thousands) were 14–154–15 was blended in a Banbury mixer with the coagulated polyisoprene together with 50 phr. (part per hundred of total rubber) HAF carbon black to obtain a range of compounds having a variety of block polymer contents.

The effect of milling the compound was determined by milling 300 grams of the composition on a laboratory mill at 0.05 inch clearance, about 50° C. temperature, to a uniform 60 Mooney viscosity after which the tensile strength and elongation of each of the samples was determined. For comparison a sample containing only the polyisoprenes but no block polymer was milled to the same Mooney viscosity. FIGURE 1 shows the stress-strain results obtained in these comparative tests. It will be noted that as little as 10% of the block polymer had some reinforcing effect upon the polyisoprene and that at the 20 and 30% levels, the block polymer added substantially to the stress-strain properties of the compositions following the milling.

*Example II.—Effect of block copolymer molecular weight upon stress-strain properties*

The same mixture of high and low molecular weight polyisoprene utilized in Example I was employed in preparing the blends of this example. Three different block copolymers were milled into portions of this polyisoprene to prepare compositions containing 70 weight percent of polyisoprenes and 30 weight percent of block copolymer, together with 50 phr. HAF carbon black. A 4½ minute cycle in a Banbury mill was utilized for mixing the compositions. The three block copolymers were polystyrene-polyisoprene-polystyrene wherein the segmental molecular weights, expressed in thousands, were as follows:

| Blend No. | S | I | S | Percent weight styrene |
|---|---|---|---|---|
| A | 15 | 99 | 15 | 23 |
| B | 14 | 154 | 15 | 16 |
| C | 19 | 216 | 19 | 15 |

The blends so prepared were subjected to stress-strain testing, the results obtained being shown in FIGURE 2. It will be noted that blend A, wherein the polyisoprene middle block was only 99,000 showed the least reinforcing effect, while blend B wherein the polyisoprene metal block of the copolymer was 154,000 provided the combination of high strength combined with good elongation at break.

These differences are magnified to a certain extent when the compositions were masticated in a mill as described in Example I and reduced thereby to a Mooney viscosity of about 60.

*Example III.—Effect of milling upon rubber compositions*

Figure 3:
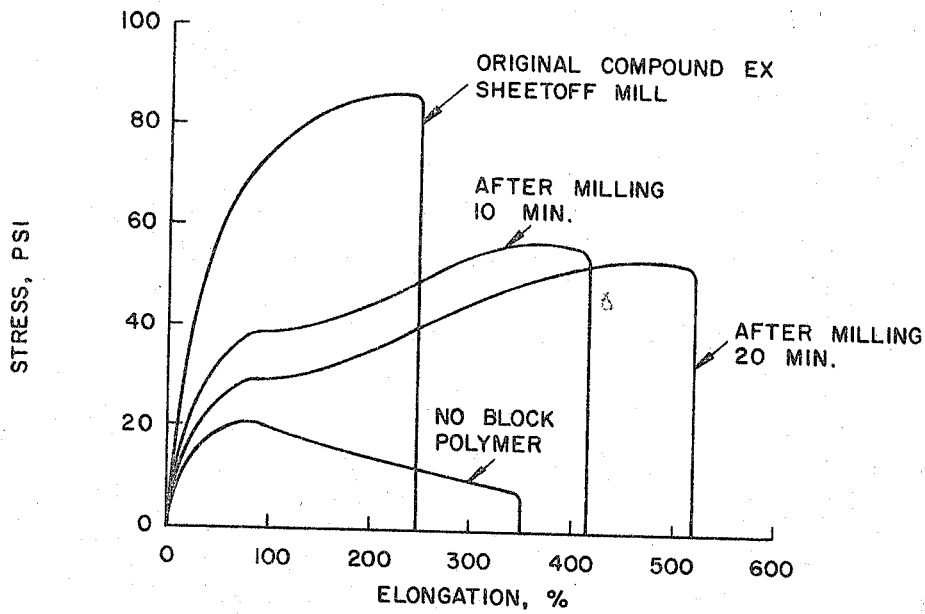

Blend B from the previous example was utilized in the comparative tests of this example. The blends were prepared by mixing the same ingredients described for Blend B for about 2 minutes in a Banbury mill, reaching a temperature of 340° F. at discharge. The compound was then milled for the times indicated in FIGURE 3 at 50° C., 300 grams charge, the mill clearance being 0.05 inch. FIGURE 3 shows that without any block copolymer present the original mixture of high and low molecular weight polyisoprenes had poor stress-strain properties while the addition of the block copolymer prior to the second milling operation showed substantially improved results which were largely maintained after both 10 and 20 minutes of the second milling treatment.

*Example IV.—Improvement of drying rate of low molecular weight elastomer by blending with block copolymer*

A series of compositions were prepared from a low molecular weight polyisoprene, having an intrinsic viscosity of 3.2 dl./g. This low molecular weight polyisoprene could not be dried in the standard tunnel dryer utilized for the drying of high molecular weight (8+ intrinsic viscosity) polyisoprene coagulated crumb.

A block copolymer comprising polystyrene-polyisoprene-polystyrene (19,000–216,000–19,000 molecular weight) but combined with the polyisoprene in amounts of 25, 33.3 and 50% by weight. Blending was by means of combining cements of the polymers and coagulating the mixture by means of a steam jet. The wet polymers were then dried at a temperature of 82° C., the rate of drying being established and shown in FIGURE 4. This figure shows that the combination of low molecular weight polyisoprene and block copolymer dries at a faster rate than the block copolymer alone and also, of course, faster than the undriable low molecular weight polyisoprene. The best results were obtained with a ground crumb having a relatively uniform particle size as compared with the original crumb where particle size was comparatively broad in distribution.

We claim as our invention:

1. The process for recovering a conjugated diene homopolymeric elastomer composition comprising the steps of forming a cement of said elastomer, the elastomer having an intrinsic viscosity of 2–4 dl./g., forming a cement of a block copolymer having the general configuration $$A-B-A$$

wherein each A is a polymer block of a monoalkenyl-substituted aromatic hydrocarbon, said block having an average molecular weight of 2000–100,000 and B is a polymer block of a conjugated diene, said block having an average molecular weight of 25,000–1,000,000; mixing the two cements, coagulating the mixture of elastomer and block copolymer by contacting the cement mixture with a hot aqueous medium whereby the cement solvent is vaporized, and drying the coagulated mixture.

2. A process according to claim 1 wherein the elastomer is polyisoprene and has an intrinsic viscosity between about 2 and 4 dl./g., and the block copolymer comprises 12.5–45% by weight of the mixture.

3. In the process of claim 1, the step of subjecting the mixed cements to a high rate of shear in excess of 1000 reciprocal seconds.

References Cited

UNITED STATES PATENTS

| | | | |
|---|---|---|---|
| 2,688,605 | 9/1954 | Tucker | 260—894 X |
| 3,159,691 | 12/1964 | Kraus | 260—894 |
| 3,182,052 | 5/1965 | Naylor | 260—894 X |
| 3,238,173 | 3/1966 | Bailey et al. | 260—29.7 |
| 3,265,765 | 8/1966 | Holden et al. | 260—876 |

FOREIGN PATENTS

| | | |
|---|---|---|
| 608,921 | 9/1960 | Italy. |
| 852,823 | 11/1960 | Great Britain. |
| 1,270,016 | 7/1961 | France. |

SAMUEL H. BLECH, *Primary Examiner.*

MURRAY TILLMAN, *Examiner.*

G. F. LESMES, *Assistant Examiner.*